United States Patent
Björn et al.

(10) Patent No.: US 10,207,557 B2
(45) Date of Patent: Feb. 19, 2019

(54) ROBOTIC WORKING TOOL

(71) Applicant: HUSQVARNA AB, Huskvarna (SE)

(72) Inventors: Jonathan Björn, Jönköping (SE);
Martin Elonsson, Huskvarna (SE);
Anders Sjögren, Forserum (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/318,148

(22) PCT Filed: Jun. 19, 2014

(86) PCT No.: PCT/EP2014/062915
§ 371 (c)(1),
(2) Date: Dec. 12, 2016

(87) PCT Pub. No.: WO2015/192900
PCT Pub. Date: Dec. 23, 2015

(65) Prior Publication Data
US 2017/0129297 A1    May 11, 2017

(51) Int. Cl.
*B60G 9/02* (2006.01)
*B60G 7/02* (2006.01)
(Continued)

(52) U.S. Cl.
CPC ............. *B60G 9/02* (2013.01); *A01D 34/008* (2013.01); *A01D 34/81* (2013.01); *A01D 75/26* (2013.01); *B60G 7/02* (2013.01); *B60G 7/04* (2013.01); *B60K 1/02* (2013.01); *B60L 1/003* (2013.01); *B60L 3/0061* (2013.01); *B60L 8/003* (2013.01); *B60L 11/1805* (2013.01);
(Continued)

(58) Field of Classification Search
CPC ... B60G 9/02; B60G 7/02; B60G 7/04; B60G 2300/08; B60G 2300/084; B60G 2401/17; A01D 75/26; B60L 8/003; B60L 11/1816; B60L 2200/40; B60K 1/02
See application file for complete search history.

(56) References Cited

U.S. PATENT DOCUMENTS 3,426,720 A * 2/1969 Enos .................... B62D 53/021
                                                180/244
3,669,469 A * 6/1972 Hartelius ............. B62D 21/186
                                                180/14.1
(Continued)

FOREIGN PATENT DOCUMENTS

CN    201217456 Y    4/2009
CN    202400172 U    8/2012
(Continued)

OTHER PUBLICATIONS

International Search Report and Written Opinion for International Application No. PCT/EP2014/062915 dated Feb. 13, 2015, all enclosed pages cited.

(Continued)

*Primary Examiner* — Laura Freedman
(74) *Attorney, Agent, or Firm* — Burr Forman McNair

(57) ABSTRACT

A robotic work tool system may include a robotic work tool. The robotic work tool may include two front wheels and a chassis. The robotic work tool is characterized in that the two front wheels are arranged on a beam axle that is pivotably arranged to the chassis.

9 Claims, 5 Drawing Sheets

(51) Int. Cl.
- *B60G 7/04* (2006.01)
- *A01D 75/26* (2006.01)
- *A01D 34/00* (2006.01)
- *B60L 1/00* (2006.01)
- *B60L 3/00* (2006.01)
- *B60L 8/00* (2006.01)
- *B60L 11/18* (2006.01)
- *B60L 15/20* (2006.01)
- *B62D 53/02* (2006.01)
- *A01D 34/81* (2006.01)
- *G05D 1/02* (2006.01)
- *B60K 1/02* (2006.01)

(52) U.S. Cl.
CPC ....... *B60L 11/1816* (2013.01); *B60L 11/1818* (2013.01); *B60L 11/1877* (2013.01); *B60L 15/20* (2013.01); *B62D 53/028* (2013.01); *G05D 1/0265* (2013.01); *B60G 2300/08* (2013.01); *B60G 2401/17* (2013.01); *B60L 2200/40* (2013.01); *B60L 2240/36* (2013.01); *B60L 2240/421* (2013.01); *B60L 2260/32* (2013.01); *G05D 2201/0208* (2013.01); *Y02T 10/645* (2013.01); *Y02T 10/705* (2013.01); *Y02T 10/7005* (2013.01); *Y02T 10/7072* (2013.01); *Y02T 10/7083* (2013.01); *Y02T 10/72* (2013.01); *Y02T 10/7275* (2013.01); *Y02T 90/14* (2013.01)

(56) References Cited

U.S. PATENT DOCUMENTS

| | | | | |
|---|---|---|---|---|
| 3,976,302 A * | 8/1976 | Hammarstrand | ........ | B60G 9/02 180/41 |
| 4,079,955 A | 3/1978 | Thorpe et al. | | |
| 4,161,322 A * | 7/1979 | Ekeborg | ........ | B60G 9/02 280/124.112 |
| 4,533,010 A * | 8/1985 | Harder | ........ | B62D 53/02 180/41 |
| 4,750,751 A * | 6/1988 | Schafer | ........ | A01D 75/285 180/41 |
| 5,806,870 A * | 9/1998 | Hull | ........ | B62D 21/186 280/400 |
| 5,813,697 A * | 9/1998 | Bargenquast | ........ | B60G 9/02 280/6.154 |
| 5,873,586 A * | 2/1999 | Krimmell | ........ | B60G 3/00 280/124.113 |
| 5,927,736 A * | 7/1999 | Salfinger | ........ | A61G 5/00 280/104 |
| 6,062,333 A * | 5/2000 | Gordon | ........ | A01D 34/64 180/311 |
| 6,231,061 B1 * | 5/2001 | Cope | ........ | B60K 17/24 180/312 |
| 7,721,832 B2 * | 5/2010 | Fischer | ........ | B60G 9/02 180/9.5 |
| 7,866,671 B2 * | 1/2011 | Madler | ........ | A01D 34/66 180/41 |
| 8,694,161 B2 | 4/2014 | Deveze et al. | | |
| 9,878,587 B1 * | 1/2018 | Zevenbergen | ........ | B60D 7/00 |
| 2001/0033067 A1 * | 10/2001 | Vangsgard | ........ | B60G 7/001 280/400 |
| 2006/0095169 A1 | 5/2006 | Minor et al. | | |
| 2012/0195724 A1 | 8/2012 | Toebes et al. | | |
| 2013/0054026 A1 | 2/2013 | Jang et al. | | |
| 2013/0341105 A1 | 12/2013 | Hukkanen | | |
| 2017/0042085 A1 * | 2/2017 | Bjorn | ........ | A01D 34/008 |
| 2017/0168499 A1 * | 6/2017 | Bjorn | ........ | G05D 1/0265 |
| 2017/0351260 A1 * | 12/2017 | Willgert | ........ | G05D 1/027 |

FOREIGN PATENT DOCUMENTS

| | | | |
|---|---|---|---|
| CN | 102700633 A | 10/2012 | |
| CN | 103534180 A | 1/2014 | |
| FR | 2702012 A1 * | 9/1994 | ............ B60G 9/02 |
| JP | S62283072 A | 12/1987 | |
| WO | 02062194 A1 | 8/2002 | |
| WO | 2012083060 A1 | 6/2012 | |
| WO | 2012084947 A1 | 6/2012 | |
| WO | 2014007694 A1 | 1/2014 | |
| WO | 2014007728 A1 | 1/2014 | |

OTHER PUBLICATIONS

International Preliminary Report on Patentability for International Application No. PCT/EP2014/062915 dated Dec. 20, 2016, all enclosed pages cited.

* cited by examiner

ROBOTIC WORKING TOOL

TECHNICAL FIELD

This application relates to a robotic work tool system for improved traction, and in particular to a robotic work tool system for improved operation among obstacles.

BACKGROUND

As robotic work tool are becoming more and more advanced the requirements on their sealing is also increased which makes their bodies or chassis more (torsionally) rigid. This leads to that as the robotic work tool(s) runs over obstacles or holes causing one wheel to be lifted up by the obstacle, another wheel will also be lifted which may cause the robotic work tool to lose traction. Furthermore, any odometri may be affected by such slip and a proper navigation, such as by deduced (dead) reckoning, may be impeded.

Many prior art solutions are available that allow one wheel to move independently of the other, such as independent suspension, however, they suffer from being expensive and difficult to manufacture and to assemble—especially if they are to be able to detect collisions and/or lift events.

There is thus a need for a robotic work tool that is able to maintain traction even when operating in rugged terrain with many obstacles, but is still simple and cheap to manufacture and providing a reliable operation in rugged terrain.

SUMMARY

It is an object of the teachings of this application to overcome the problems listed above by providing robotic work tool system comprising robotic work tool, said robotic work tool comprising two front wheels and a chassis, wherein said robotic work tool is characterized in that the two front wheels are arranged on a beam axle being pivotably arranged to the chassis.

The inventors of the present invention have realized, after inventive and insightful reasoning, that a robotic work tool having a single common beam axle will have its two front wheels balancing each other thereby providing a smooth and stable operation of the robotic work tool, even in rugged terrain. Furthermore, by only having one beam axle, the problems of the prior art may be solved using a minimum of different parts which leads to cheap manufacture and easy assembly. The one part solution is also very robust and easy to maintain thus making the robotic work tool suitable for operation in outdoor environments.

The use of a beam axle provides for a geniously simple solution that solves the problem of the prior art without requiring any other suspension for the front wheels, thereby making the robotic work tool even more robust than it would have been with other suspension means—as suspension means often require difficult assembly and maintenance.

As the beam axle enables the front wheels to balance each other, the front wheels will also stabilize each other and the chassis of the robotic work tool enabling a smooth and stable operation.

Compared with an obvious solution of suspending each front wheel, the solution provided herein is suitable for lift detection and is also more robust, and cheaper to manufacture and assemble.

In one embodiment the robotic work tool is a robotic lawnmower. In one embodiment the robotic work tool is a farming equipment. In one embodiment the robotic work tool is a golf ball collecting tool. The robotic work tool may also be a vacuum cleaner, a floor cleaner, a street sweeper, a snow removal tool, a mine clearance robot or any other robotic work tool that is required to operate in a work area in a methodical and systematic or position oriented manner.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
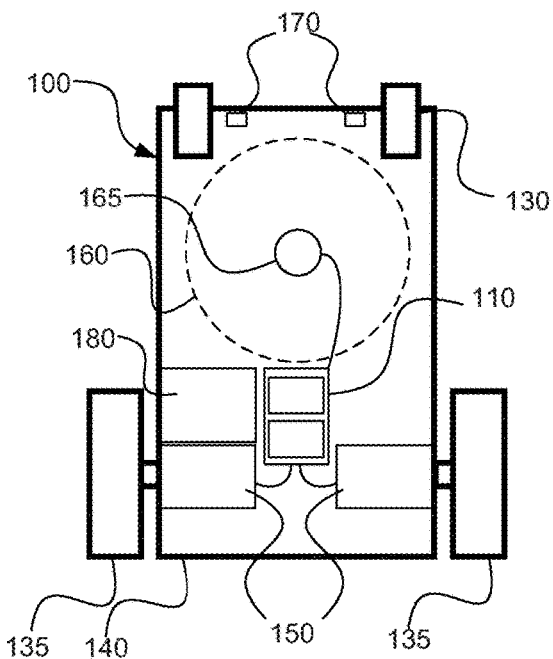
FIG. 1 shows a schematic overview of a robotic work tool according to one embodiment of the teachings of this application.

FIG. 1 shows a schematic overview of a robotic work tool 100 having a chassis 140 (that is to be arranged with a body or cover not shown individually) and a plurality of wheels 130, 135. In the exemplary embodiment of FIG. 1 the robotic work tool 100 has two front wheels 130A and 130B and two rear wheels 135A and 135B. At least some of the wheels 130, 135 are drivably connected to at least one electric motor 150—in this embodiment the two rear wheels 135 are drivably connected to the motor 150. It should be noted that even if the description herein is focused on electric motors, combustion engines may alternatively be used possibly in combination with an electric motor.

In the example of FIG. 1, the rear wheels 135 are connected to each an electric motor 150. This allows for driving the rear wheels 135 independently of one another which, for example, enables steep turning.

The robotic work tool 100 also comprises a controller 110 and other circuitry such as a memory for controlling the operation of the robotic work tool 100. The robotic work tool 100 further has at least one sensor 170, in the example of FIG. 1 there are two sensors 170, arranged to detect a magnetic field (not shown) caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a robotic lawnmower.

The robotic work tool 100 may also have (at least) one battery 180 for providing power to the motors 150 and the cutter motor 165. Connected to the battery 180 are two charging connectors, for receiving a charging current from a charger (referenced 220 in FIG. 2) of the charging station (referenced 210 in FIG. 2). Alternatively, the batteries may be solar charged.

Alternatively, the robotic work tool and/or the cutter may be driven by an engine.

Figure 2:
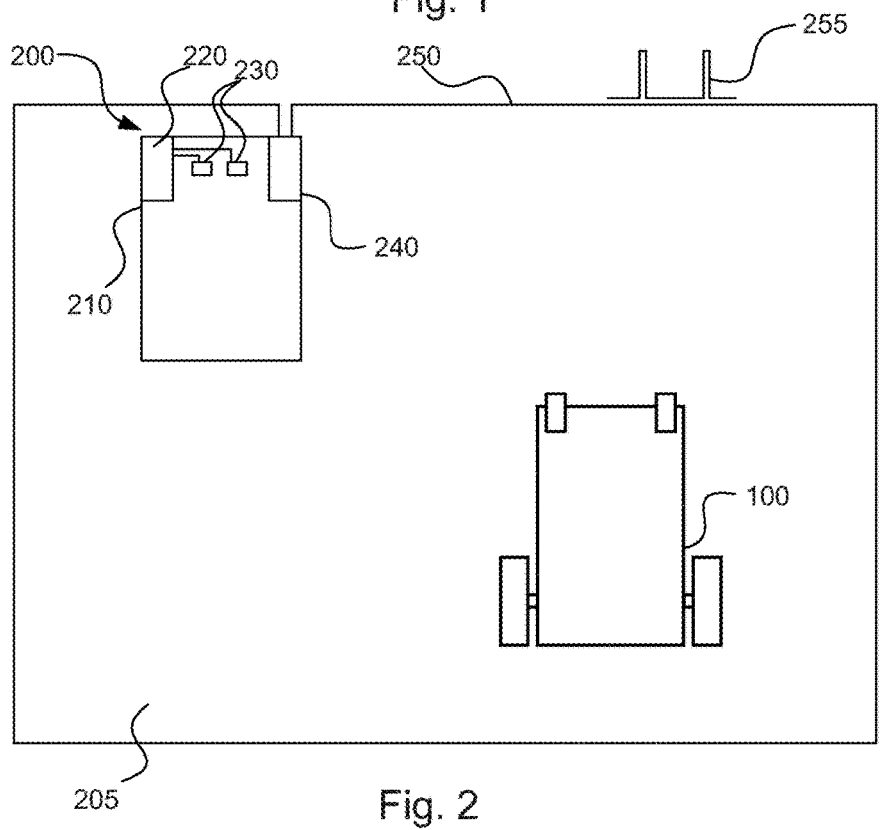
FIG. 2 shows a schematic view of a robotic working tool system according to one embodiment of the teachings of this application.

FIG. 2 shows a schematic view of a robotic working tool system 200 comprising a charging station 210 and a boundary wire 250 arranged to enclose a working area 205, the working area 205 not necessarily being a part of the robot system 200.

The robotic work tool 100 of FIG. 2 is a robotic work tool 100 such as disclosed with reference to FIG. 1. A charging station 210 has a charger 220 coupled to, in this embodiment, two charging connectors 230. The charging connectors 230 are arranged to cooperate with corresponding charging connectors of the robotic work tool 100 for charging the battery 180 of the robotic work tool 100.

The charging station 210 also has, or may be coupled to, a signal generator 240 for providing a control signal 255 (for more details see FIG. 3) to be transmitted through the boundary wire 250. As is known in the art, the current pulses 255 will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed.

Figure 3:
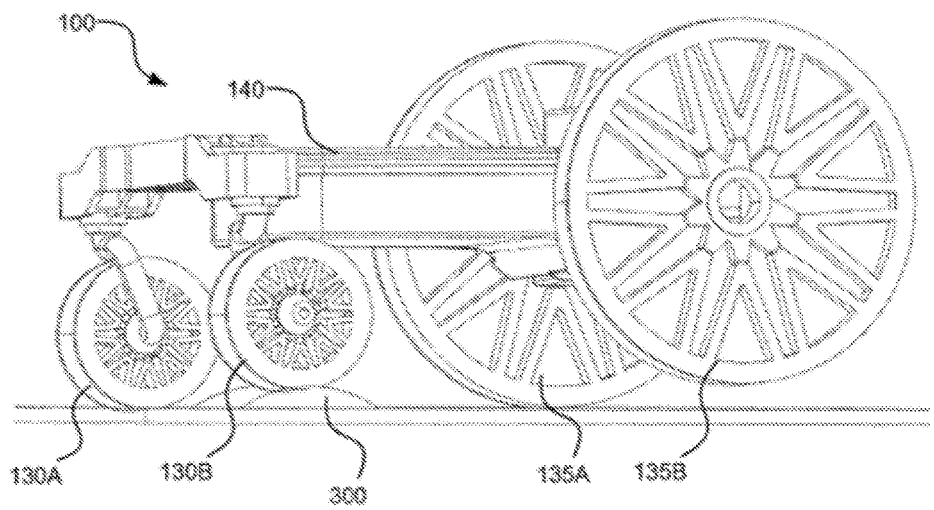
FIG. 3 shows a schematic illustration of a problem of prior art robotic work tools.

FIG. 3 shows a schematic illustration of a problem of prior art robotic work tools. In this example the robotic work tool 100 is operating in an area having at least one obstacle 300, in this example a small bump. Other obstacles can be debris, twigs, branches, piles, bumps, pipes, hoses and other protruding objects, as well as holes, trenches, etc.

As robotic work tools commonly operate in outdoor environments where they are subjected to moisture, wetness and dirt, it is important for the robotic work tool to be properly sealed to allow for proper operation. However, it is difficult to properly seal a robotic work tool without also making the chassis 140 rigid. As the chassis 140 is rigid, the robotic work tool 100 will behave in one of two ways depending on its design when it encounters an obstacle such as the bump 300. As one front wheel 130B climbs over the obstacle, either the other front wheel 130A or the corresponding rear wheel 135B will be lifted into the air making the robotic work tool 100 unstable. Also, the robotic work tool 100 may lose traction for one or more wheels should such situation occur which may cause the robotic work tool to become stuck or start to slide. As would be understood by a skilled person this is a problematic and unwanted situation. In the example of FIG. 3, the rear wheel 135B has been lifted.

Figure 4:
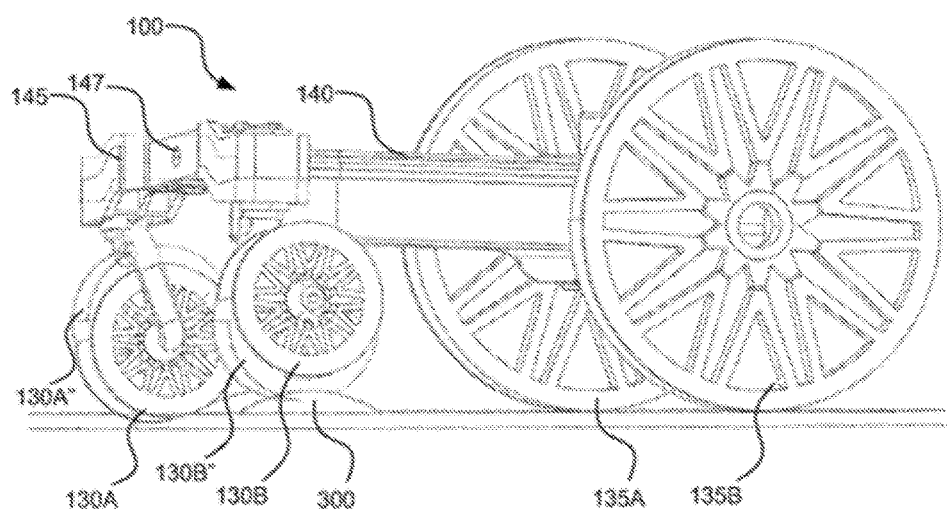
FIG. 4 shows a schematic overview of a robotic work tool overcoming the prior art problem of FIG. 3 according to one embodiment of the teachings of this application.

FIG. 4 shows a schematic overview of a robotic work tool overcoming the prior art problem of FIG. 3 according to one embodiment of the teachings of this application.

The inventors have realized that by arranging the two front wheels 130A and 130B on a common beam axle 145 that is pivotably arranged to the chassis 140 of the robotic work tool 100, the robotic work tool 100 will be able to handle obstacles, such as the bump 300, without loosing grip or traction. As one front wheel 130B goes over the bump 300, it is lifted and the beam axle 145 is pivoted around a pivot point 147 preventing the chassis 140 of the robotic work tool 100 to tilt thereby keeping the other front wheel 135A as well as the rear wheel(s) 135 on the ground.

The use of a single common beam axle is advantageous as it allows for a very simple construction that is easy to install, and to maintain. It is also cheap to manufacture and is also less prone to break as it requires few parts.

A solution relying on, for example, individually suspended front wheels would be require an advanced attachment system or linkage means to still be able to allow for lift and collision detection and would as such be expensive and not as robust as the clever and simple solution provided by the present invention.

In FIG. 4 a comparison is shown between the positions of a robotic work tool 100 without a beam axle 145 (dashed lines) and one with (full lines) thereby illustrating how the beam axle 145 enables the robotic work tool to overcome obstacles 300 while keeping the chassis 140 of the robotic work tool 100 stable.

Figure 5:
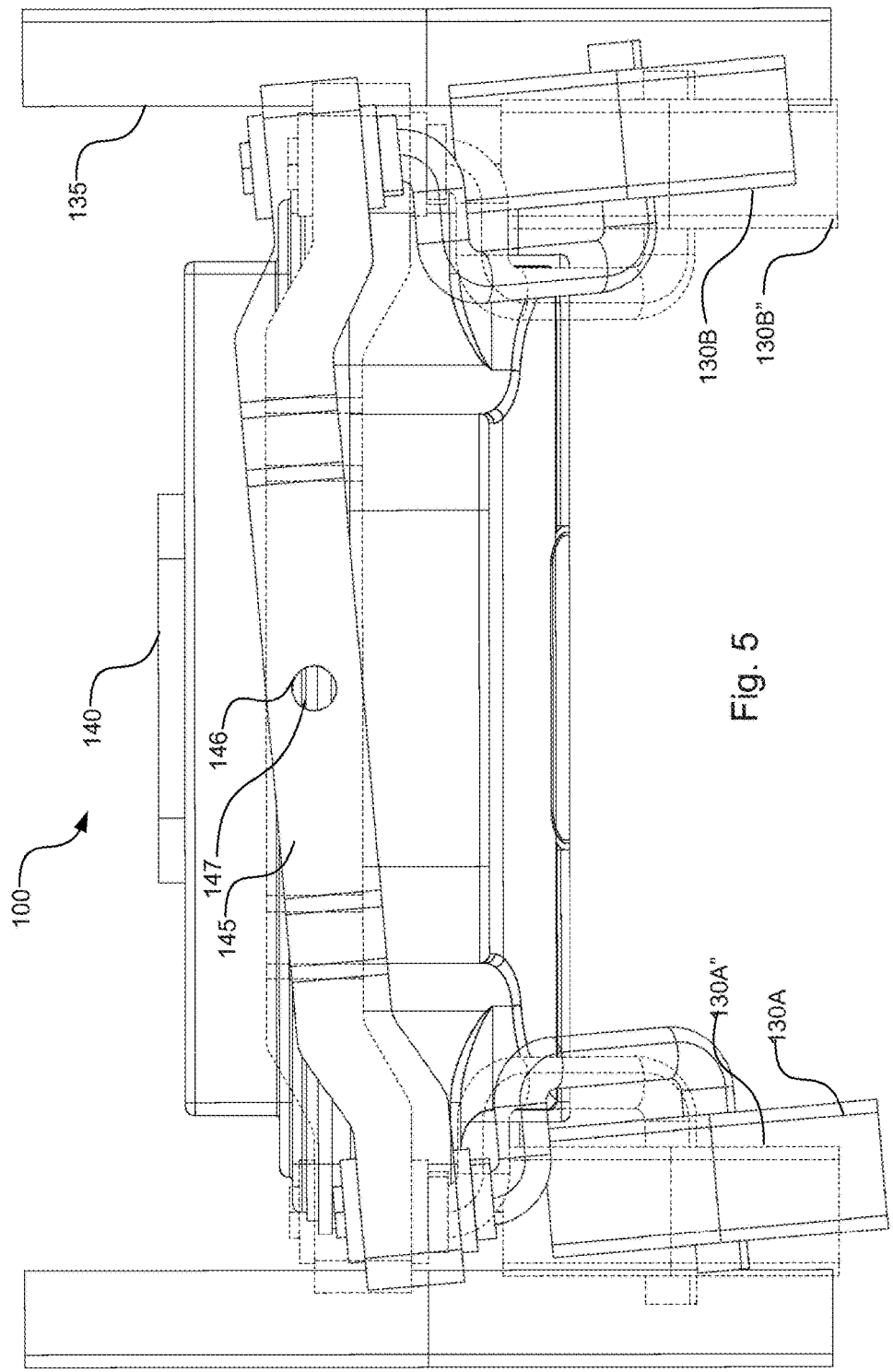
FIG. 5 shows a schematic front view of a robotic work tool according to one embodiment of the teachings of this application.

FIG. 5 shows a schematic front view of a robotic work tool according to one embodiment of the teachings of this application. The beam axle is shown as both being horizontal (dashed lines) and being pivoted (full lines) to illustrate the function of the beam axle 145. As is shown in FIGS. 4 and 5, the beam axle 145 is pivotably attached to the chassis 140 through a pivot point 147, which in one embodiment is an axle protruding from the chassis and extending through a hole or opening 146 in the beam axle 145. This provides for a cheap and simple design that is robust and thus suited for outdoor use. The protruding (pivot) axle 147 may also be attached to the beam axle in other manners such as being clamped to the beam axle.

In one embodiment the protruding (pivot) axle is attached to the beam axle through a cap. To allow for simple lift detection, the cap is designed to allow for vertical movement of the pivot axle 147, by having an elongated receiving opening. As the robotic work tool 100 is in operation the pivot axle 147 will rest against the beam axle 145 in the lower portion of the cap (or rather the chassis 140 will rest on the pivot axle 147) and as the robotic work tool 100 is lifted, the pivot axle will rest on the upper portion of the cap (or rather, the cap will carry the beam axle 145). Alternatively the hole or opening 147 in the beam axle 145 may be made elongated to provide the same functionality as an elongated cap.

By arranging sensors such as magnetic sensors or touch sensors it is thus easy to determine whether the robotic work tool 100 is being lifted or not by simply determining in which portion of the cap the pivot axle is.

Figure 6A:
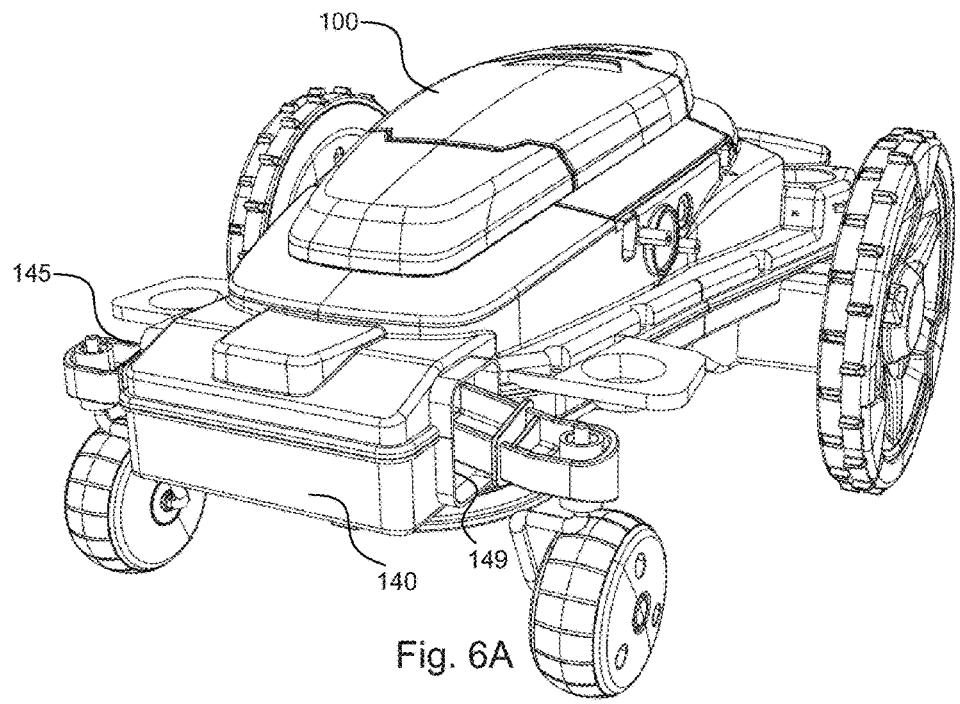
FIGS. 6A and 6B each shows a schematic overview of a robotic work tool according to one embodiment of the teachings of this application.
Figure 6B:
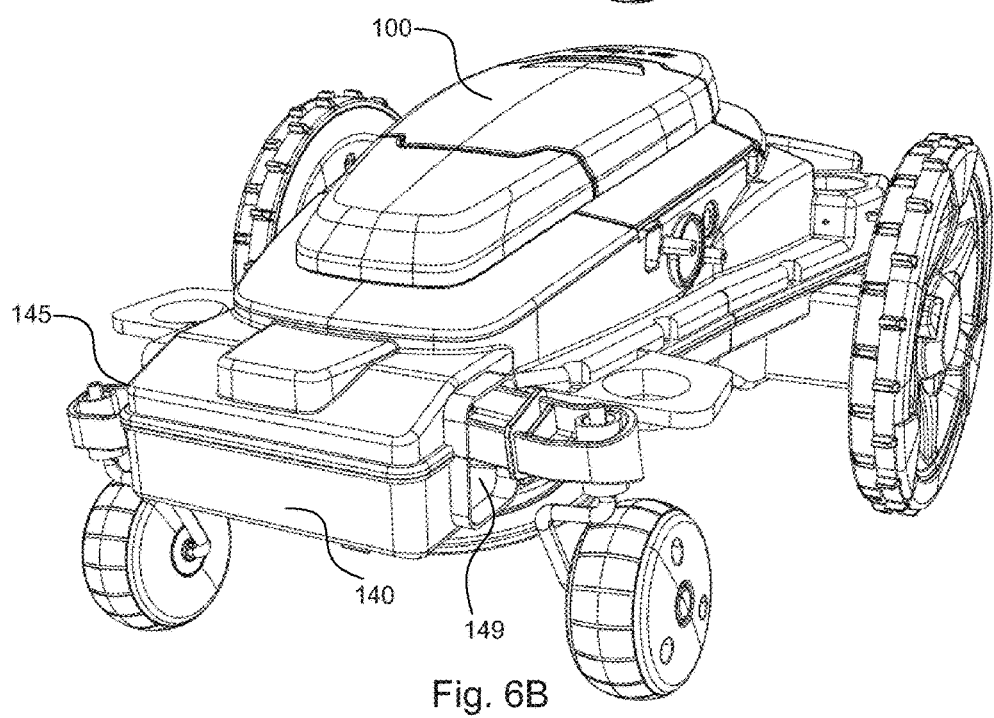

FIGS. 6A and 6B each shows a schematic overview of a robotic work tool 100 according to one embodiment of the teachings of this application, wherein the beam axle 145 is covered by the chassis 140 (for example by a cover of the chassis 140).

The chassis (or the cover of the chassis, which is to be considered as being a part of the chassis for the purpose of this application) has two openings 149 through which the beam axle 145 protrudes. This allows for the beam axle to be covered by the chassis to protect the beam axle 145 and the pivot point from environmental factors such as dirt and water. To offer more protection the opening(s) 149 may be covered for example by a rubber or cloth gaiter.

As can be seen the openings 149 allows the beam axle to be displaced a certain amount. The displacement needed depends on the overall design of the robotic work tool but in one embodiment the maximum displacement is 15 mm. The displacement is usually in the range of 10 to 25 mm. The limited displacement of the beam axle prevents the cutting tool 160 (or other work tool) to hit the ground as the chassis 140 of the robotic work tool 100 tilts when a front wheel encounters a hole. The limited displacement will then allow the beam axle to carry the front wheel 135 through the hole without the robotic work tool 100 tilting too much, the beam axle stabilizing the chassis 140 of the robotic work tool 100. The robotic work tool 100 will thus be able to operate and move in a stable manner even in surroundings where there are holes.

The displacement of the beam axle 145 can also be limited by for example stoppers arranged on the chassis 140. The stoppers may alternatively be arranged on the beam axle 145 or stoppers may be arranged on both the beam axle and the chassis 140 (or other part of the robotic work tool 100). In the embodiment of FIGS. 6A and 6B, the openings 149 act as stoppers. It should be noted that embodiments having openings 149 may also have other stoppers.

Figure 7A:
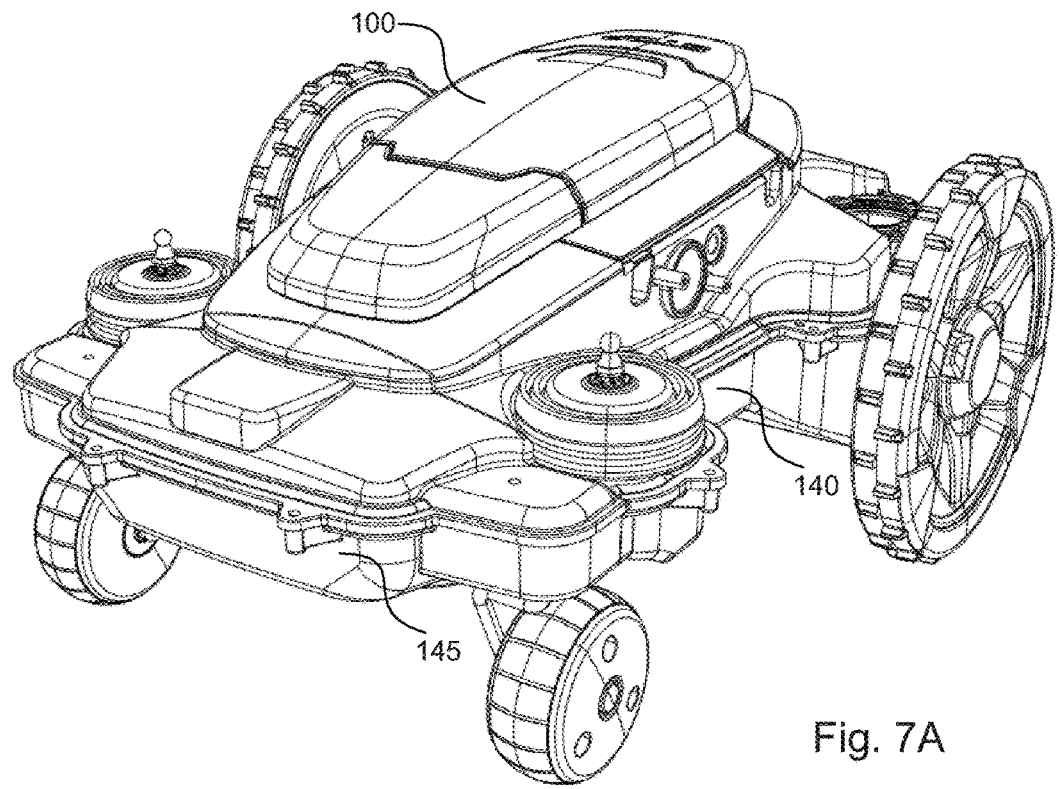
FIGS. 7A and 7B each shows a schematic overview of a robotic work tool according to one embodiment of the teachings of this application.
Figure 7B:
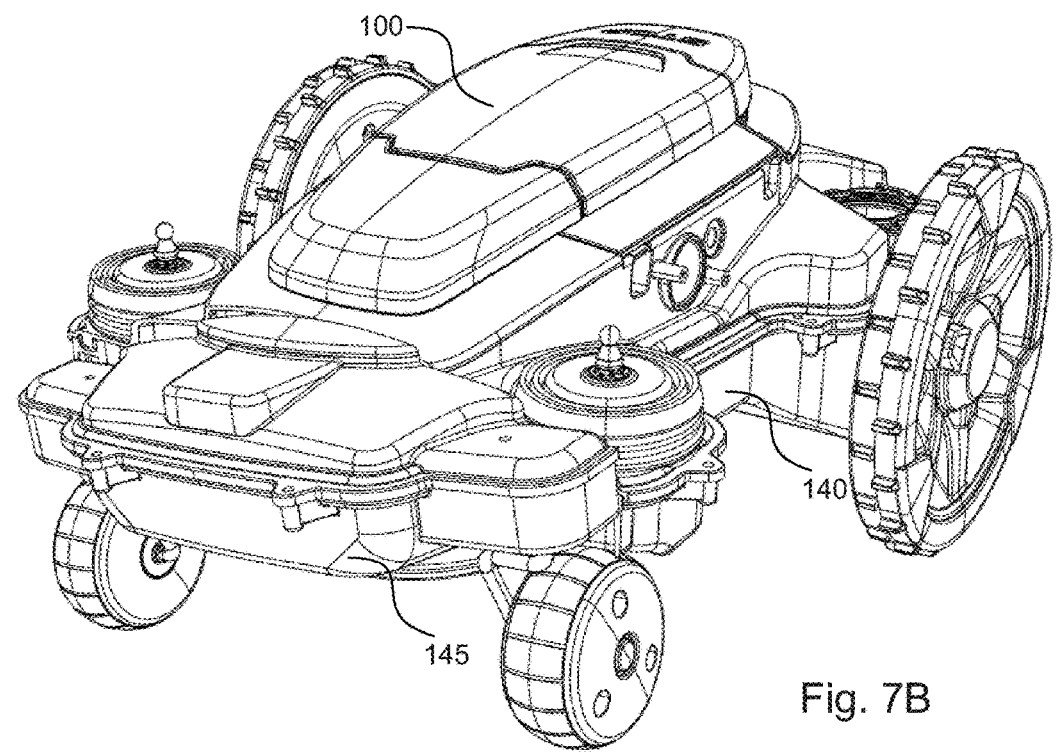

FIGS. 7A and 7B each shows a schematic overview of a robotic work tool according to one embodiment of the teachings of this application, wherein a front portion of the chassis 140 is arranged to be able to pivot relative the rest or remainder of the chassis 140. In such an embodiment the front portion 145 of the chassis 140 effectively forms a beam axle 145. This allows for an alternative manner of sealing any components or circuitry such as sensors or detectors arranged close to the beam axle 145.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a robotic work tool, said robotic work tool comprising two front wheels and a chassis, wherein the two front wheels are arranged on a beam axle being pivotably arranged to the chassis,
    wherein the beam axle is pivotably attached to the chassis through a pivot point being an axle protruding from the chassis and extending through an opening in the beam axle,
    wherein the axle at the pivot point extends through a vertically oriented elongated slot disposed in the beam axle, and
    wherein responsive to movement of the axle upward in the elongated slot, a lifting of the robotic work tool is detected.

2. The robotic work tool system according to claim 1, wherein said beam axle is arranged to balance one front wheel to the other front wheel.

3. The robotic work tool system according to claim 2, wherein said beam axle is a single beam axle common to both front wheels.

4. The robotic work tool system according to claim 1, wherein the robotic work tool further comprises a stopper for restricting a maximum displacement of said beam axle.

5. The robotic work tool system according to claim 4, wherein said stopper is an opening in the chassis so that the chassis is arranged to cover a pivot point.

6. The robotic work tool system according to claim 1, wherein the beam axle is arranged as a front portion of the chassis, wherein the front portion of the chassis is pivotably arranged to a remainder of the chassis.

7. The robotic work tool system according to claim 1, wherein a sensor is provided to determine a location of the axle in the elongated slot.

8. The robotic work tool system according to claim 7, wherein the sensor is a magnetic sensor.

9. The robotic work tool system according to claim 7, wherein the sensor is a touch sensor.

* * * * *